Figure 1:
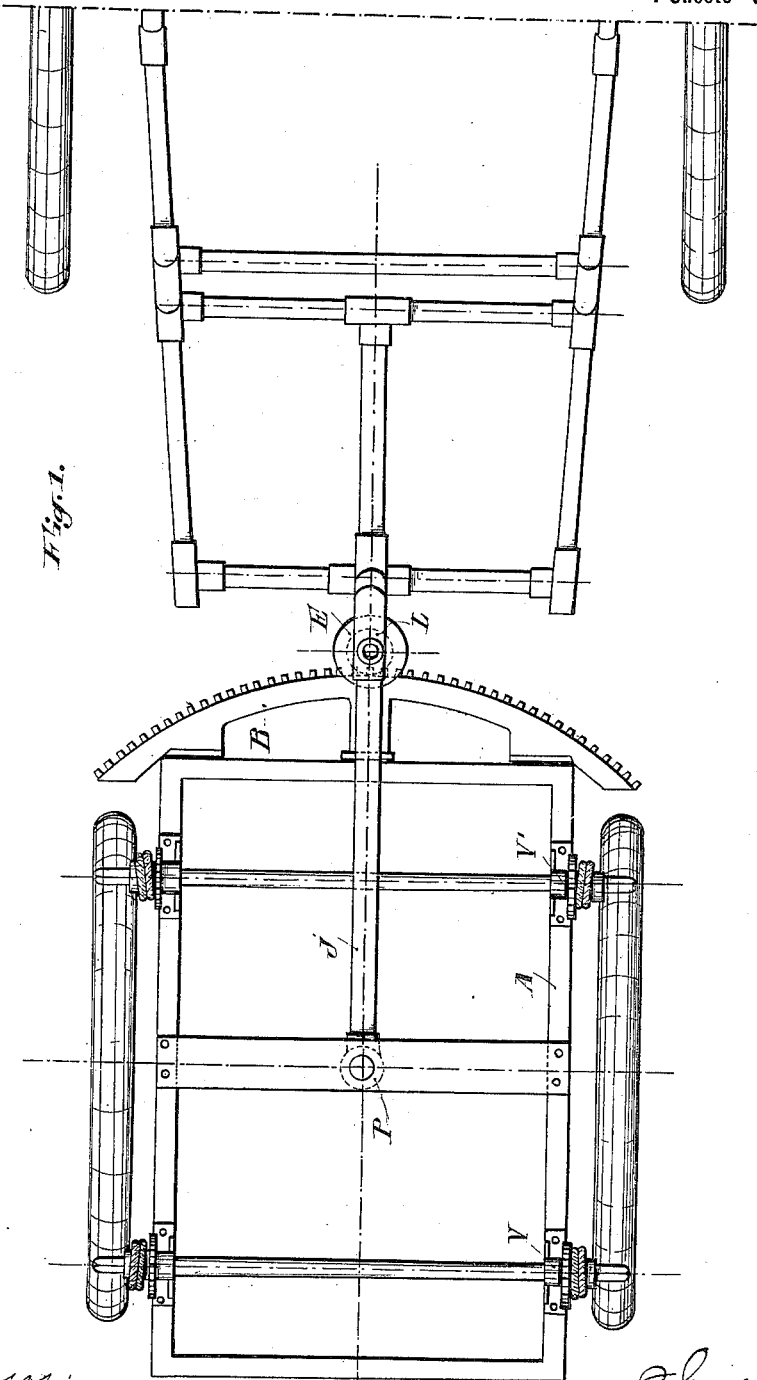

No. 652,673. Patented June 26, 1900.
J. GREFFE.
MOTOR VEHICLE.
(Application filed Oct. 13, 1899.)
(No Model.) 4 Sheets—Sheet 1.

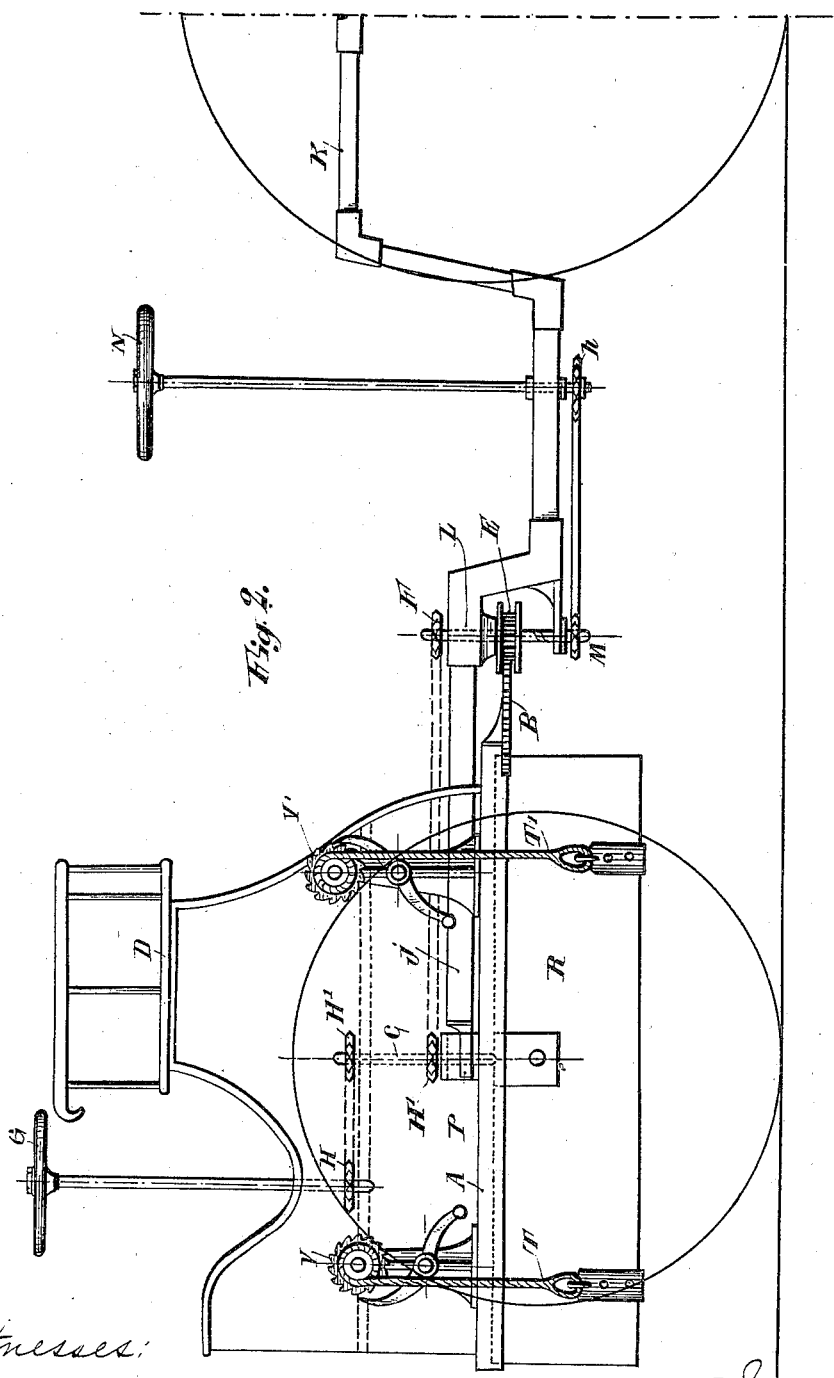

No. 652,673. Patented June 26, 1900.
J. GREFFE.
MOTOR VEHICLE.
(Application filed Oct. 13, 1899.)
(No Model.) 4 Sheets—Sheet 3.
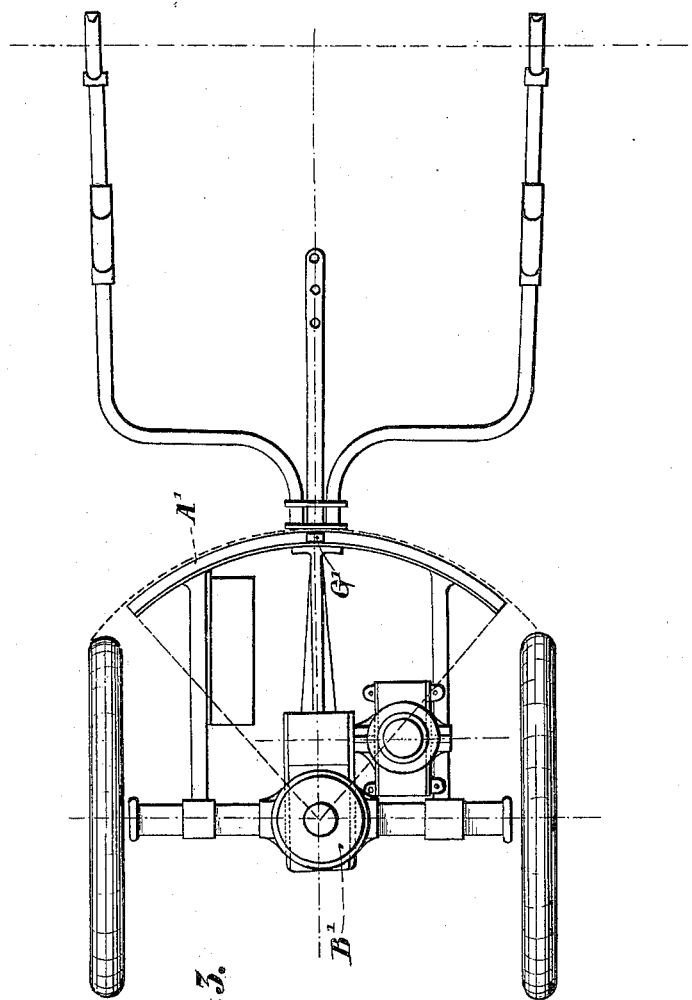

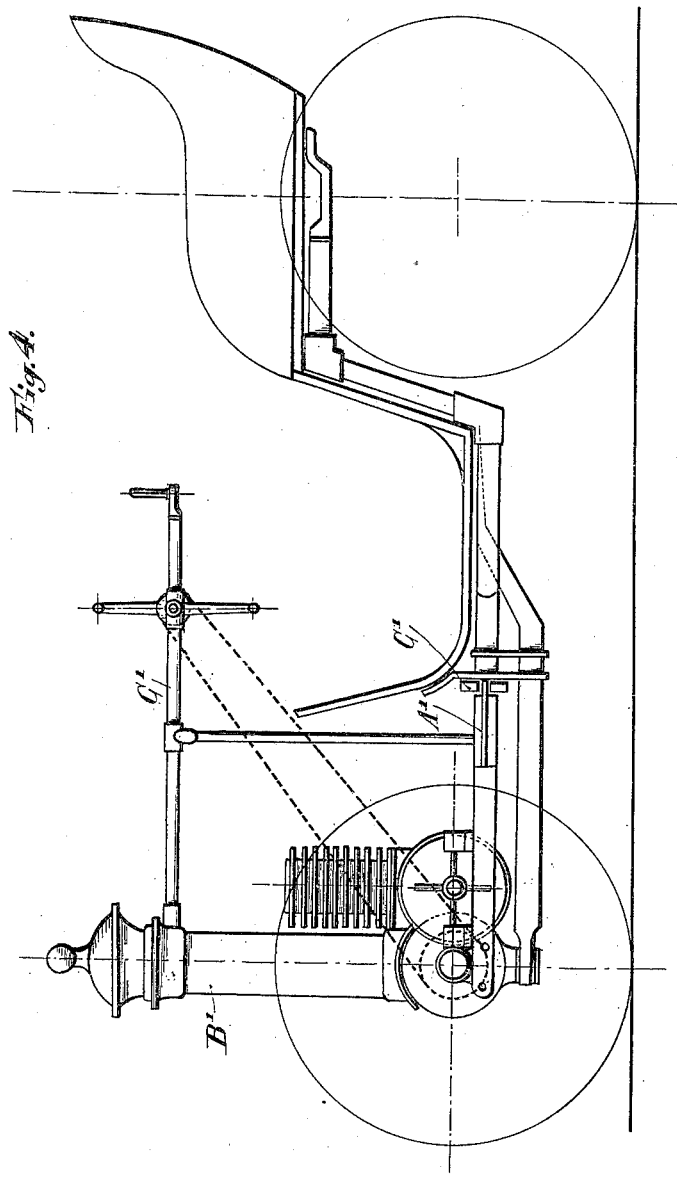

UNITED STATES PATENT OFFICE.

JOSEPH GREFFE, OF PARIS, FRANCE.

MOTOR-VEHICLE.

SPECIFICATION forming part of Letters Patent No. 652,673, dated June 26, 1900.

Application filed October 13, 1899. Serial No. 733,530. (No model.)

*To all whom it may concern:*

Be it known that I, JOSEPH GREFFE, a citizen of the Republic of France, and a resident of Paris, France, have invented certain new and useful Improvements in Motor Fore Carriages for Vehicles, of which the following is a specification.

My present invention relates to improvements in motor-cars or similar vehicles, the object being to provide an improved motor fore carriage for such vehicles constructed, combined, and arranged as fully described hereinafter, and specifically pointed out in the appended claims, reference being made to the accompanying drawings, wherein—

Figure 1 is a plan view of a vehicle provided with the improved motor fore carriage actuated by electricity. Fig. 2 is a side elevation of the vehicle. Fig. 3 is a plan view of another vehicle having a modified steering mechanism. Fig. 4 is a side elevation of same.

Like letters refer to like parts throughout all the figures.

Referring to the drawings, A represents a frame mounted upon two wheels and which supports the mechanism, a storage battery, the seat of the motorman, &c. The vehicle-frame is pivotally secured to said frame A by means of a joint-bolt C, passing through an eye in the beam J.

B is an arched rack secured at the rear part of the frame A. The center of said arched rack or sector coincides with the center of the aforesaid joint-bolt, around which the fore carriage may be moved.

D represents the seat for the motorman, said seat being secured on the frame A and moving with the latter.

E is a toothed pinion arranged between two flanges fitting over and under the toothed sector B and preventing the oscillation of the fore carriage without hindering the other movements thereof.

F is a sprocket-wheel keyed on the shaft of pinion E. Said pinions are made integral and actuated by means of the hand-wheel G through the agency of chains extending around the sprocket-wheels H H' H'', as clearly shown in the drawings.

J is the beam of the vehicle K, having an eye P. On said beam is formed at L a suitable socket through which works the shaft of the pinions F E.

The fore carriage may be otherwise moved by means of the pinion M, made integral with the pinion E and adapted to be rotated by means of the hand-wheel N through the agency of a chain extending around a sprocket-wheel *h*, as shown. Whatever be the arrangement of the steering mechanism, the storage battery R is suspended under the axletree of the fore carriage by means of cords, chains, or equivalents T T', extending over winding-drums V V', serving to raise and lower the storage battery, as required. Another steering mechanism is shown in Figs. 3 and 4, representing the fore carriage as actuated by a petroleum-motor, said steering mechanism differing from the aforegoing in that, first, the sector A' is not toothed and adapted to freely slide between two rollers G; second, a reservoir B' is provided to contain petroleum or any other suitable liquid, said reservoir serving at the same time to secure the handle or steering-bar C', the reservoir B' being mounted upon the axletree of the fore carriage, and, third, the handle or steering-bar C'' is adapted to directly actuate the fore carriage. In either case the fore carriage is characterized by its sector or segment, provided or not with teeth and moving about the joint-bolt, said sector or segment being guided in such manner that it prevents longitudinal movements of the fore carriage without hindering transverse movements thereof. It is further characterized by the peculiar arrangement requiring but a single bolt passing through the eye of the vehicle-beam for insuring the backward and forward movements of the vehicle.

The advantages obtained by the new construction of fore carriage consist in that the latter may be actuated by any desired motor, that the steering may be effected from the seat of the fore carriage, as well as from the seat of the vehicle proper, and that the longitudinal oscillations and vibrations are completely avoided, while the fore carriage and hind carriage may be independently moved in transverse directions, said carriages being jointed together by means of the bolt C, so that the improved arrangement avoids any deformation and provides a most simple construction. Furthermore, the improved fore carriage permits the application of any desired winch for raising and lowering the storage battery when an electric motor is employed and the utilization of the liquid-reservoir for securing the handle or steering-bar when a petroleum-motor is employed.

Having fully described my invention, what I claim, and desire to secure by Letters Patent, is—

1. The combination with the rear carriage of a vehicle, and a forwardly-projecting beam on said carriage, and having an eye, of the fore carriage comprising a frame and the axletree, a vertical pivotal bolt extending through the said eye and the axletree, a toothed segment carried by the rear portion of the frame of the fore carriage, the center of the circle of said segment coinciding with the center of the pivotal bolt, a vertical shaft carried by the rear carriage, a toothed wheel on the latter shaft gearing with the toothed segment, and means adapted to actuate the shaft of the toothed wheel.

2. The combination with the hind carriage of a vehicle of the independent fore carriage, means for pivotally connecting the hind carriage to the fore carriage, a storage battery arranged under the axletree of the latter, and suitable winches for raising and lowering said storage battery as required, substantially as set forth.

3. The combination with the hind carriage of a vehicle, of the independent fore carriage, means for pivotally connecting the hind carriage to the fore carriage, a suitable reservoir on the axletree of the latter, a handle or steering-bar secured in said reservoir and suitable connections between said bar and the pivoting fore carriage, substantially as and for the purpose set forth.

In testimony whereof I have hereunto set my hand in presence of two witnesses.

JOSEPH GREFFE.

Witnesses:
J. ALLISON BOWEN,
J. S. ABERCROMBIE.